(12) United States Patent
Hatcher et al.

(10) Patent No.: US 8,267,050 B1
(45) Date of Patent: Sep. 18, 2012

(54) ADJUSTABLE LEASH WITH AUTOMATIC SLACK TAKE-UP ASSEMBLY

(76) Inventors: Brandon Hatcher, Guttenberg, NJ (US); Kerensa Durr, Guttenberg, NJ (US)

( * ) Notice: Subject to any disclaimer, the term of this patent is extended or adjusted under 35 U.S.C. 154(b) by 492 days.

(21) Appl. No.: 12/683,744

(22) Filed: Jan. 7, 2010

(51) Int. Cl.
*A01K 27/00* (2006.01)
(52) U.S. Cl. ........................................ 119/797; 119/795
(58) Field of Classification Search .................. 119/772, 119/792, 795, 797, 798; D30/153; 410/96, 410/97, 100
See application file for complete search history.

(56) References Cited

U.S. PATENT DOCUMENTS

| | | |
|---|---|---|
| 939,902 A | 11/1909 | Garrison |
| 2,333,488 A | 11/1943 | Parth |
| 2,356,715 A | 8/1944 | Webster |
| 2,861,547 A | 11/1958 | Dale |
| 3,332,398 A | 7/1967 | Mintz |
| 3,752,127 A | 8/1973 | Baker |
| 4,019,463 A | 4/1977 | Kitchen |
| 4,391,226 A | 7/1983 | Guthrie |
| 4,562,792 A | 1/1986 | Pak |
| 4,567,628 A | 2/1986 | Prete, Jr. |
| 4,763,609 A | 8/1988 | Kulik |
| 4,881,303 A | 11/1989 | Martini |
| 5,005,527 A | 4/1991 | Hatfield |
| 5,038,719 A | 8/1991 | McDonough |
| 5,099,799 A | 3/1992 | Giacobbe |
| 5,363,810 A | 11/1994 | Kraus |
| 5,423,644 A | 6/1995 | First, Sr. |
| 5,462,019 A | 10/1995 | Hong-Rong |
| D381,473 S | 7/1997 | Dixon |
| 5,649,504 A | 7/1997 | Culp |
| 5,680,832 A | 10/1997 | McCrosson |
| D388,558 S | 12/1997 | Miller |
| 5,732,660 A * | 3/1998 | David et al. ................... 119/792 |
| D393,504 S | 4/1998 | Eisman |
| 5,806,467 A | 9/1998 | Arakawa |
| 5,864,927 A | 2/1999 | Lie |
| D454,235 S | 3/2002 | Kaplan |
| D454,670 S | 3/2002 | Weller |
| 6,371,346 B1 * | 4/2002 | Sharma ........................ 224/578 |
| 6,453,851 B1 | 9/2002 | Holt, Jr. |
| 6,662,753 B1 | 12/2003 | Sporn |
| 6,675,742 B1 | 1/2004 | Shiraki |
| 6,851,393 B2 | 2/2005 | Bremm |
| 6,971,334 B1 | 12/2005 | Livesay |
| 7,096,827 B2 | 8/2006 | Sporn |
| 7,188,585 B1 * | 3/2007 | Carter .......................... 119/798 |
| 2005/0263107 A1 | 12/2005 | Stephanos |
| 2008/0017121 A1 | 1/2008 | Mauro |

* cited by examiner

*Primary Examiner* — Kimberly Berona
(74) *Attorney, Agent, or Firm* — Virginia P. Shogren (57) ABSTRACT

An adjustable leash with automatic slack take-up assembly comprising a pulley buckle and cam buckle. The lead end of the leash strap is affixed to a top opening of the pulley buckle, and the leash body is movably threaded in operative order through a first opening of the cam buckle, a bottom opening of the pulley buckle, and a second opening of the cam buckle. In operation, a user maintains a grip at all times on the lead handle. The user depresses the spring loaded tab with the user's other hand. While depressing the spring loaded tab, the user pulls a pull tab on the cam buckle with the second hand to either lengthen or shorten the device. Once a desired length has been formed, with automatic slack take-up as the leash length is adjusted, the user releases the spring loaded tab to lock the device into position.

20 Claims, 5 Drawing Sheets

ADJUSTABLE LEASH WITH AUTOMATIC SLACK TAKE-UP ASSEMBLY

FIELD OF THE INVENTION

This invention relates generally to animal leashes, and more particularly to a single-strap leash capable of being selectively shortened, while in use, and without change in lead hand position, to a plurality of secure, locked lengths of up to less than half the strap's original length with corresponding simultaneous automatic slack take-up.

BACKGROUND OF THE INVENTION

Dog owners are required to keep their animals restrained when in public. Various leash designs have been developed to allow a dog walker to adjust the length of the leash depending on the environment being traveled. For example, in less populated areas, a dog walker may desire a longer leash length to allow the animal greater room to roam. In contrast, urban city environments are replete with both enticements and hazards to the dog, and a walker may desire a shorter leash length to keep tighter control over the animal. In addition, during the course of a typical urban walk, the dog alternately passes through areas requiring more animal control (shorter leash length), and less animal control (longer leash length). Particularly in an urban environment, the walker needs a strong and secure leash regardless of leash length due to the close proximity of other dogs, people and vehicles.

Some adjustable leash designs provide advantages while simultaneously creating potential hazards to both the walker and dog. Examples include leashes that require unclipping and re-clipping to make the leash shorter, and designs that create slack in the leash that hangs down. The former designs (requiring two-handed manipulation of clips, slides and the like) require the user to remove his/her hand from the primary leash handle, thereby giving the animal an opportunity to lunge away from the owner and potentially free itself of the leash. The latter designs (in which open slack is created upon reducing the length of the leash) create tangling and tripping hazards with the excess leash that are unsafe to both dog and walker.

Consequently, whereas adjustable leashes have been developed to provide more discriminating control over a dog (or other animal), these leash designs exhibit one or more drawbacks that make them unsuitable. The drawbacks include: 1) required complicated folding to lessen the length of the leash; 2) required unclipping/re-clipping of leash parts; 3) required opening of the lead (handle loop) to shorten the leash; 4) required external parts that must be added to the leash in order to shorten it; 5) designs that create slack that hangs when the leash is shortened; 6) designs that require a change in hand position from the lead in order to adjust the leash length; 7) designs that create freely hanging loose ends of the leash when the leash is shortened; 8) designs wherein the size of the leash lead (handle loop) increases upon leash shortening; 9) designs that provide only a select number of set lengths for adjustment; 10) designs that have multiple parts that break, leaving a leash that is unusable; 11) designs that shorten the leash by only half (or less) of its original length; and, 12) designs that do not provide additional benefit to the walker, such as the ability to carry pet waste disposable bags, keys, water bottles, and the like.

Accordingly, there is an as of yet unmet need in the art for an adjustable leash design that: 1) does not require complicated folding to lessen the length of the leash; 2) does not require unclipping/re-clipping of leash parts; 3) does not require the opening of the lead (handle loop) to shorten the leash; 4) does not involve external parts that must be added to the leash in order to shorten it; 5) that takes up slack as the leash is shortened; 6) that does not require a change in hand position from the lead in order to adjust the leash length; 7) that does not create freely hanging loose ends of leash strap when the leash is shortened; 8) that does not cause the size of the leash lead (handle loop) to increase upon leash shortening; 9) that is not limited to a select number of set lengths for adjustment; 10) that does not have multiple parts that might break that would result in an unusable leash; 11) that can be shortened by more than half its original length; and, 12) that provides the additional benefit of providing means for the walker to carry objects along the walk, such as pet waste disposable bags, keys, water bottles, and the like.

THE INVENTION

Summary of the Invention

The inventive Adjustable Leash with Automatic Slack Take-Up Assembly of this application comprises a leash strap having a lead end, a clasp end, a first length forming a lead handle, and a second length forming a leash body. The slack take-up assembly comprises a pulley buckle and a cam buckle. The pulley buckle defines a top opening and a bottom opening, with the bottom opening further defined by a pulley buckle bar. The cam buckle defines a first and second opening; the first opening is further defined at a top end by a cam buckle bar; the second opening is further defined by a spring loaded tab. The cam buckle may further comprise a pull tab. The lead end of the strap is affixed to the top opening of the pulley buckle, and the leash body is movably threaded in operative order through the first opening of the cam buckle, through the bottom opening of the pulley buckle, and through the second opening of the cam buckle.

In operation, a user maintains a grip at all times on the lead handle. The user depresses the spring loaded tab with the user's other hand. While depressing the spring loaded tab, the user pulls the pull tab with the second hand to either lengthen or shorten the device. Once a desired length has been formed, with automatic slack take-up by the pulley and cam buckles as the leash length is adjusted, the user releases the spring loaded tab to lock the device into the desired position.

BRIEF DESCRIPTION OF THE DRAWINGS

The invention is described in more detail with reference to the attached drawings, in which.

DETAILED DESCRIPTION OF THE ILLUSTRATIVE EMBODIMENT

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention.

In this regard, the invention is illustrated in the several figures, and is of sufficient complexity that the many parts, interrelationships, and sub-combinations thereof simply cannot be fully illustrated in a single patent-type drawing. For clarity and conciseness, several of the diagrams show in schematic, or omit, parts that are not essential in that diagram to a description of a particular feature, aspect or principle of the invention being disclosed. Thus, the best mode embodiment of one feature may be shown in one diagram, and the best mode of another feature will be called out in another diagram.

Adjustable Leash with Automatic Slack Take-Up Assembly

Figure 1:
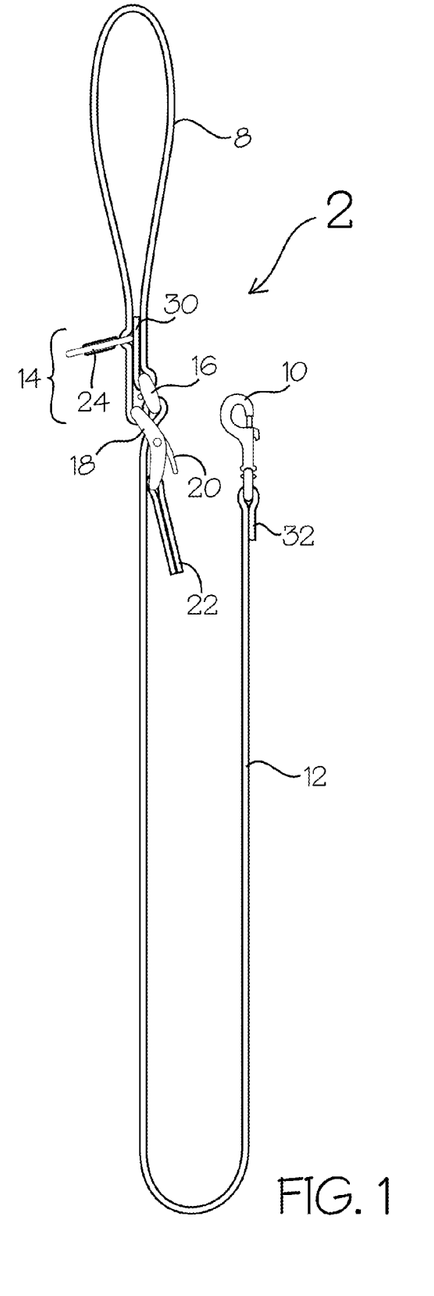
FIG. 1 is a side elevation view drawing of the inventive leash device adjusted to a full length, according to the invention.

FIG. 1 shows the inventive leash device adjusted to a full length 2, according to the invention. Referring to FIG. 1, the device 2 has the general appearance of a typical strap leash with looped lead handle 8, strap body 12, and clasp 10 for attachment to an animal's collar (shown in FIGS. 6A-6D). The device 2 further comprises two buckles: a pulley buckle 16 and a cam buckle 18. The cam buckle 18 comprises a spring-loaded locking tab 20 and a pull tab 22.

In the preferred embodiment as shown in FIG. 1, the device 2 comprises a single length of strap 12 with a lead end of the strap 30 affixed to the pulley buckle 16, and a clasp end of the strap 32 affixed to the clasp 10. Intermediate to ends 30 and 32, the strap 12 first forms a looped handle 8 and is movably threaded through: 1) the cam buckle 18; 2) the pulley buckle 16; and, 3) back through the cam buckle 18.

Figure 4:
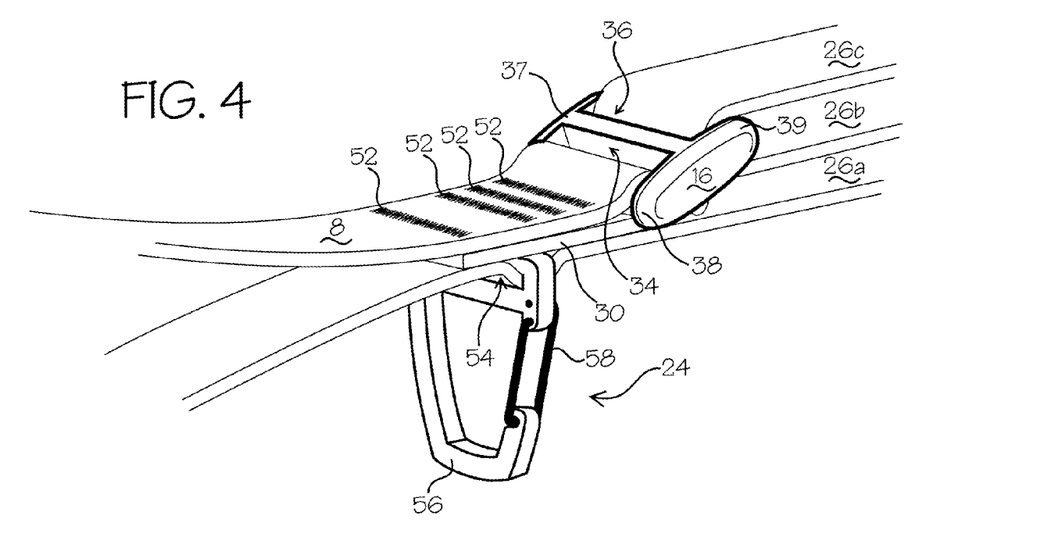
FIG. 4 is a perspective exploded view drawing of the pulley buckle with leash straps, according to the invention.

Referring to FIG. 1, the device 2 may further comprise a carabiner clip 24 affixed proximate the base 14 of the lead 8. As further discussed in connection with FIG. 4, the carabiner clip 24 may be used to attach objects to be transported, such as pet waste disposable bags, keys, water bottles, and the like. As shown in FIGS. 1 and 4, the strap 12 is threaded through a base end opening 54 defined by the clip 24 and is retained by thread 52 sewn into the strap material 8/30 on both sides of the base end opening 54.

Figure 2:
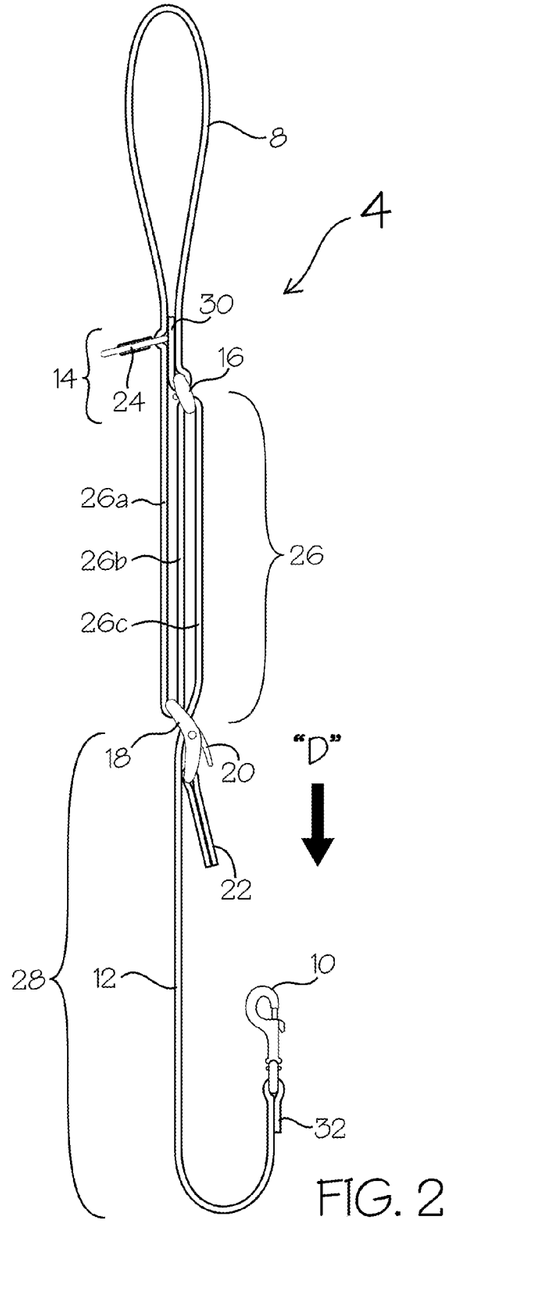
FIG. 2 is a side elevation view drawing of the inventive leash device adjusted to a mid-range length, according to the invention.

FIG. 2 shows the inventive leash device adjusted to a mid-range length 4, according to the invention. Referring to FIGS. 1 and 2, the cam buckle 18 of FIG. 2 has been manually moved to a lower position from that shown in FIG. 1 (further away from the lead 8 and closer to the clasp 10). Referring to FIG. 2, the slack 26 has been automatically taken up by the slack take-up assembly comprising the pulley buckle 18 and the cam buckle 20. A user (not shown) has depressed the spring tab 20 of the cam buckle 18 while simultaneously manually pulling the pull tab 22 in a downward direction "D". As a result, the leash has been shortened to a mid-range length 4 with slack automatically taken up in region 26.

As shown in FIG. 2, the result of the automatic slack take-up assembly 16, 18 is a three-layered strap region 26 comprising strap layers labeled 26a, 26b and 26c. Strap layer 26a represents the strap region extending from the base of the lead 14 to the cam buckle 18; strap layer 26b represents the central strap layer extending from the cam buckle 18 to the pulley buckle 16, and strap layer 26c represents the third strap layer extending from the pulley buckle 16 back down to the cam buckle 18. The slack 26 comprises that portion of the strap 12 forming layers 26b and 26c. As shown in FIG. 2, the layers 26a, 26b and 26c are retained by generally vertically oriented buckles 16 and 18 in parallel position with the straps 26a, 26b, 26c defining narrow slot spaces between them.

The tension level on the strap 12 correlates to the proximity of the straps 26a, 26b, 26c relative to one other. In the event an animal is pulling on the clasp end 10 as further shown and discussed in connection with FIGS. 6A-6D, further tension is placed on the strap 12 causing strap regions 26a, 26b, 26c to be retained in even closer proximity. As a result, the straps 26a, 26b, 26c do not open or form open loops that might pose a hazard to the user or the animal being retained. The slack region 26 will not catch on objects, will not wrap around the neck of the animal, will not trip the user, or otherwise interfere with use of the device 4.

Figure 3:
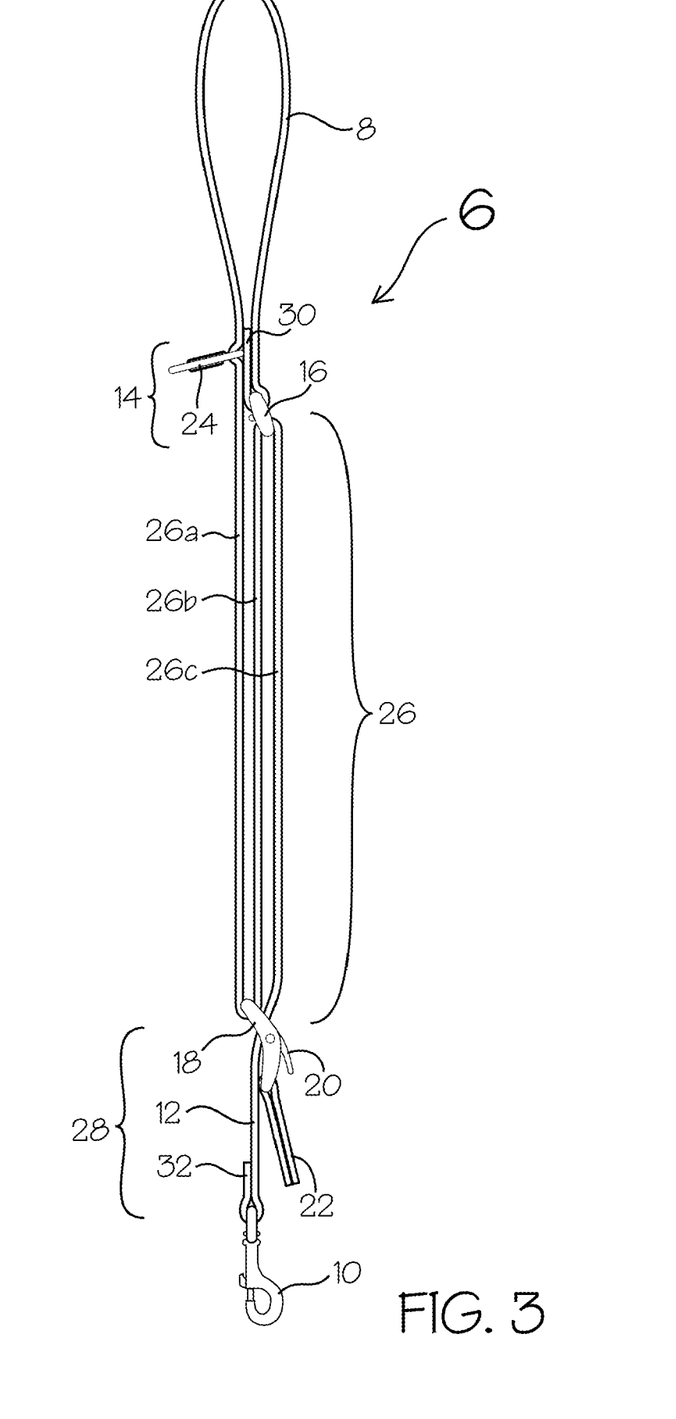
FIG. 3 is a side elevation view drawing of the inventive leash device adjusted to a short-range length, according to the invention.

FIG. 3 shows the inventive leash device adjusted to a short-range length 6, according to the invention. Referring to FIGS. 2 and 3, the device 4 may be selectively locked into any desired position along the length of the strap 12 with any and all slack created thereby (26b, 26c) automatically taken up in the slack region 26 by the slack take-up assembly 16, 18.

In addition, as shown in FIGS. 1-3, the slack take-up assembly 16, 18 permits the length of strap 12 between the base of the lead 14 and the clasp end 32 to be shortened by more than half its original length. For example, if the length of leash strap 12 from the base of the lead 14 to the clasp end 32 is 47 inches, a leash of that length reduced by half would result in a leash length of 23.5 inches. Referring to the present invention, when fully shortened, the length of strap 12 from the base of the lead 14 to the clasp end 32 is reduced from 47 inches to 17 inches, a reduction of 30 inches in strap length. The resulting leash length of 17 inches is 6.5 inches less (shorter) than a leash length reduced by half.

In the preferred embodiment, the strap 12 is made of a sturdy woven fabric strap-type material (e.g., nylon, rayon, canvas, fiber) and is approximately 1 inch (2.5 cm) in diameter. The clasp 19 and buckles 16, 18 are metallic. While these are the preferred materials, it should be understood that any suitable or desired material or combinations thereof may be utilized in the device, including but not limited to, cables, cords, leather, plastics (for the strap 12), plastics, composite plastics, metal alloys, metal composites (for the buckles 16, 18 and clip 24), various clasp 10 materials and designs, various pull tab 22 shapes, materials and designs, and the like. In addition, the lead 8 may be reinforced with additional material for comfort or strength, and/or the lead 8 may be a distinct part connected to the leash strap 12 of a non-loop design, such as an ergonomic plastic lead.

FIG. 4 shows an exploded view of the pulley buckle 16 and carabiner clip 24. As shown in FIG. 4, the pulley buckle 16 is a generally square-shaped buckle with a width corresponding to the width of the straps 30, 8, 26b, 26c threaded therein. The pulley buckle 16 defines two openings: a top opening 34 proximate the lead 8 end of the device and a spaced bottom opening 36. The openings 34, 36 are separated by a cross-bar 37. Both openings 34, 36 are shaped for slidable insertion of the strap materials 30, 8, 26b, 26c. A portion of the lead end of the strap 30 is slidably inserted through the top opening 34, is wrapped around a top buckle bar 38 and is retained through stitching 52. At the opposed end of the pulley 16, the slack portion of the leash strap 26b, 26c is inserted through the bottom opening 36 and is slidably wrapped around the bottom buckle bar 39. In the preferred embodiment, the bars 38/39 are integral solid cylindrical bars joining the opposed side walls of the buckle 16. However, it should be understood that the rods 38/39 may be of any suitable or desired shape or design and/or may be capable of rotation.

Referring to FIG. 4, the carabiner clip 24 comprises a c-shaped body 56 defining an opening spanned by a clasp closure 58. The hinged clasp 58 may be manually pushed inward to open the clip 24 to allow insertion of an object for transport in and around the c-shaped body 56, with the clasp 58 manually returned to its original position to lock the clip 24. While the preferred embodiment for a clip 24 is shown in FIG. 4, it should be understood that any suitable or desired clip design 24 may be utilized, including multiple clips, and that the position of the clip 24 may be at the base of the lead 8 as shown in FIG. 4 or located at other position(s) along the length of the strap 12.

Figure 5:
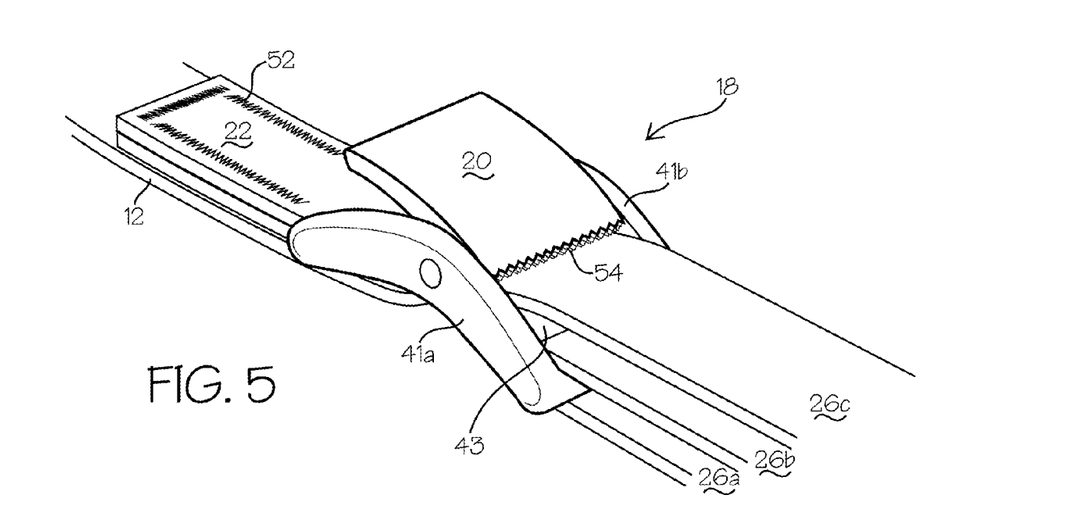
FIG. 5 is a perspective exploded view drawing of the cam buckle with leash straps and pull tab, according to the invention; and, FIGS. 6A-6D are a series of perspective view drawings of the device in operation by a user on a dog, showing the user adjusting the device from full length (FIG. 6A) to a mid-range length (FIGS. 6B-6C) to a final shortened length (FIG. 6D).

FIG. 5 is a perspective exploded view of the cam buckle 18 with leash straps 26a, 26b, 26c, 12 and pull tab 22, according to the invention. As shown in FIG. 5, the cam buckle 18 is generally rectangular in shape with curved side walls 41a, 41b and has a width corresponding to the width of the strap portions 12, 26a, 26b, 26c threaded therein. The cam buckle 18 defines two openings: a first opening 40 towards the lead 8 end of the device and a spaced second opening 42. The openings 40, 42 are separated by a cross-bar 43 and are shaped for slidable insertion of the strap materials 26a, 26b, 26c, 12.

Referring to FIG. 5, a portion of the slack 26a, 26b is slidably inserted through the first opening 40 and is slidably wrapped around a top bar 38. At the opposed end of the cam buckle 18, a portion of the leash strap 26c is inserted through the second opening 42 and is shown locked in position by application of the serrated margin 54 of a spring-loaded locking tab 20 pinning the strap material 26c against the cross bar 43. The surface of the cross bar 43 is striated for additional grip. The locking tab 20 is spring loaded and applies resistance to manual depression by a user's thumb (or other fingers) as shown in FIG. 6B. Upon release of the locking tab 20 through manual depression of same, the serrated margin 54 is raised and the strap material 26c is capable of slidable adjustment across the surface of the cross bar 43 and through the second opening 42. Upon release of the locking tab 20 through removal of manual pressure on the tab 20, the serrated margin 54 is lowered against the strap material 26c to pin it against the cross bar 43, thereby preventing further movement of the material 26c and locking the leash into the desired position.

Referring to FIG. 5, the pull tab 22 is a separate length of strap material slidably inserted through the second opening 42 of the cam buckle 18, wrapped around a bottom rod end 39, and is retained through stitching 52 and/or gluing of the strap ends. In operation, as shown in FIGS. 6B and 6C, the pull tab 22 is grasped in the palm of a hand of a user while the user's thumb depresses the locking tab 20. The pull tab 22 comfortably fits within the user's hand and gives the user leverage to pull the cam buckle 18 in an upward "U" or downward "D" direction.

In the preferred embodiment, the pull tab 22 is made of a strap material similar to the lead 8 and is approximately 3.5 inches (9 cm.) in length. However, it should be understood that any suitable or desired length, material, or means for connection of the pull tab 22 to the cam buckle 18 may be utilized. In addition, in the preferred embodiment, the bars 38/39 are integral solid cylindrical bars joining the opposed side walls of the cam buckle 18. However, it should be understood that the rods 38/39 may be of any suitable or desired shape or design and/or may be capable of rotation.

Figure 6A:
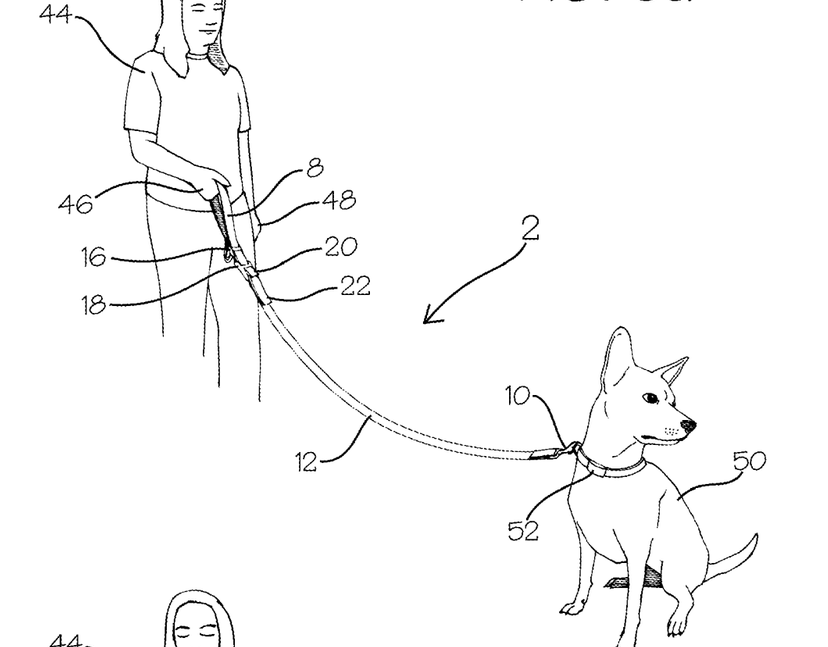
Figure 6B:
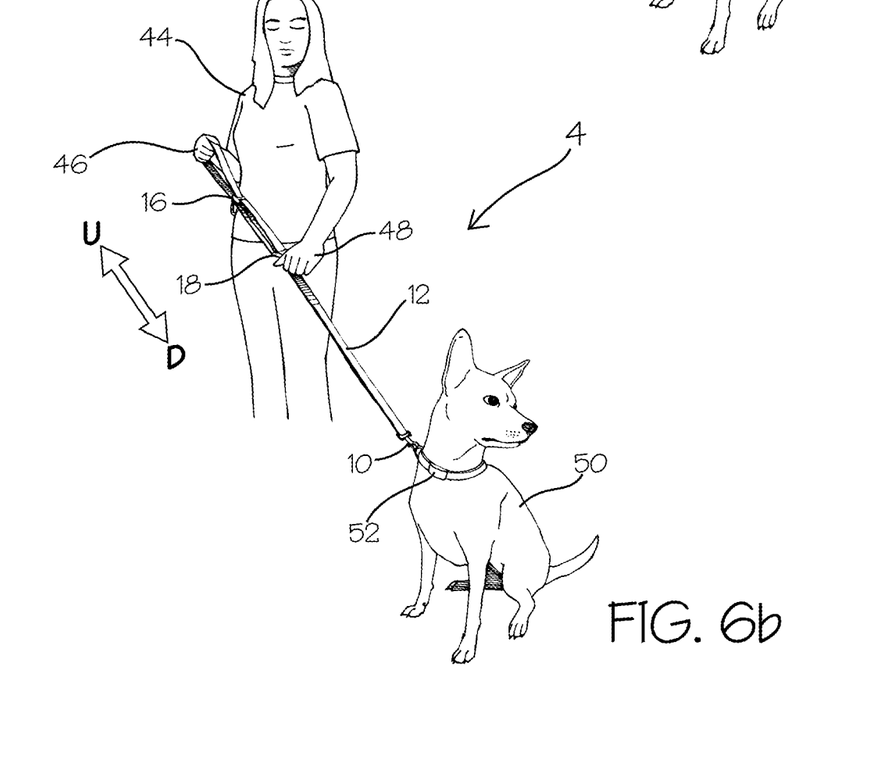
Figure 6C:
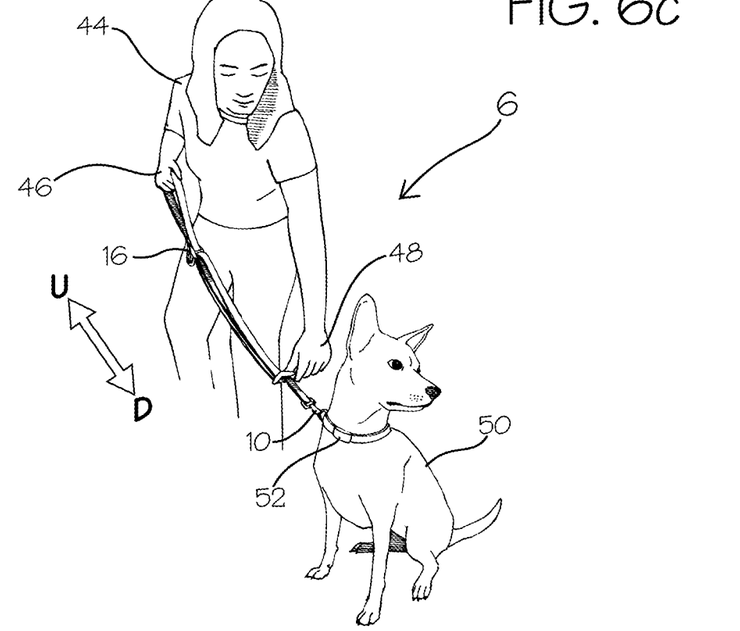
Figure 6D:
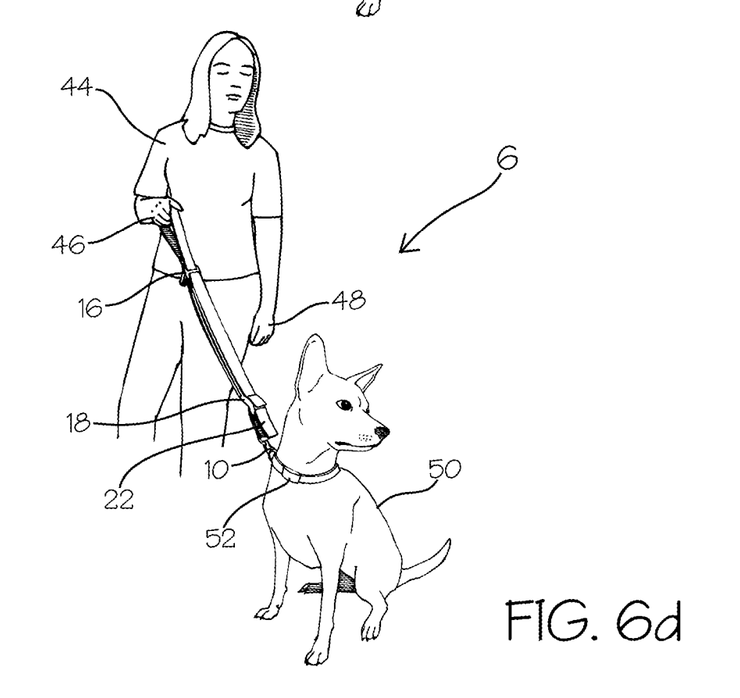

FIGS. 6A-6D are a series of perspective view drawings of the device in operation. Referring to FIGS. 6A-6D, a user has attached the device 2 to a dog and is shown adjusting the device from full length (FIG. 6A) to mid-range lengths (FIGS. 6B-6C) to a final shortened length (FIG. 6D). FIG. 6A shows the device in full length 2. FIG. 6A corresponds to the device 2 as shown in FIG. 1. FIG. 6B shows the device in a mid-range length 4. FIG. 6B corresponds to the device 4 as shown in FIG. 2. FIG. 6C shows the device in a short-range length 6. FIG. 6C corresponds to the device as shown in FIG. 3.

Referring to FIG. 6A, the lead 8 is a closed loop of strap material 12 held in the right hand 46 of a user 44. While the exemplary user 44 shown in FIGS. 6A-4D is right-handed, the same steps of operation described below apply to a left-handed user with hands reversed.

Referring to FIG. 6A, the clasp end 10 of the device 2 is attached to the collar 42 of a sitting dog 50. The device is at full length 2 allowing for a maximum distance between user 44 and dog 50.

Referring to FIGS. 6A and 6B, the user 44 desires to shorten the length of the device 4 from the full length shown in FIG. 6A. To do so, as shown in FIG. 6B, while maintaining a grip on the lead 8 with the right hand 46, the user 44 reaches down with the left hand 48 to depress the spring loaded locking tab 20 of the cam buckle 18 (shown in FIG. 5) with the user's thumb and simultaneously grasp the pull tab 22 with the other four fingers. The user 44 then pulls on the pull tab 22 in a generally downward direction shown with arrow labeled "D".

Referring to FIGS. 2 and 6B, as the device 4 is shortened, strap region 26c moves in an upward direction (toward the lead 8), while center strap region 26b moves in a downward direction (toward the clasp 10).

Referring to FIGS. 2 4, 5 and 6B, the device 4 automatically takes up slack due to the strap lengths in regions 26c and 26b fluidly adjusting through the bottom opening 36 of the pulley buckle 16, on the one hand, and the first opening 40 of the cam buckle 18, on the other hand, over and around the bars 38/39 integral to those buckles 16, 18. While strap regions 26b and 26c are adjusting, strap region 26a grows in length but remains largely stationary.

Referring again to FIGS. 2 and 6B, the user 44 may selectively release the locking tab 20 at any desired position along the length of strap 12 entering the cam buckle 18 to lock the cam buckle 18 in position. Consequently, the user 44 may adjust the full length device 2 to any mid-range length 4 desired. If the user 44 released the cam buckle 18 and pull tab 22 at the position shown in FIG. 6B, the buckle 18 would be locked into position with the resulting device at a mid-length 4 for an intermediate distance between user 44 and dog 50.

Referring to FIG. 6D, the user 44 has released the cam buckle and pull tab 22 thereby locking the buckle 18 in position with the device in a short-range length 6. The length of the device has been reduced by more than half for a minimum distance between user 44 and dog 50.

Significantly, as shown in FIGS. 6A-6D, the user 44 adjusts the leash length to any desired shorter length, including by more than half, without ever having to release the lead 8. The user's 44 right hand 46 retains the lead 8 at all times, with the left hand 48 and slack take-up assembly 16, 18, doing the "work" of shortening the device 2, 4, 6. By maintaining the user's 44 right hand 46 on the lead 8 at all times, the user 44 retains control over the animal 50 without risk of the animal 50 escaping.

Moreover, the slack tape up assembly 16, 18 provides certain leverage to the user 44 in shortening the leash length even when the animal 50 applies tension to the strap 12 by lunging or otherwise moving away from the user 44. The pulley buckle 16 maintains tension on the leash strap 12 as the spring tab 20 is released to help prevent the leash from extending uncontrollably.

Referring to FIGS. 6A and 6D, to lengthen the leash from the short range length 6 shown in FIG. 6D back to the original full length shown in FIG. 6A the operations are reversed. While maintaining a grip on the lead 8 with the right hand 46, the user 44 reaches down with the left hand 48 to depress the spring loaded locking tab 20 of the cam buckle 18 (shown in FIG. 5) with the user's thumb and simultaneously grasps the pull tab 22 with the other four fingers. The user 44 then pulls on the pull tab 22 in a generally upward direction shown with arrow labeled "U".

Referring to FIGS. 2 and 6B, as the device 4 is lengthened, strap region 26c moves in a downward direction (toward the clasp 10), while center strap region 26b moves in an upward direction (toward the lead 8).

Referring to FIGS. 2 4, 5 and 6B, the device 4 automatically takes up slack due to the strap lengths in regions 26c and 26b fluidly adjusting through the bottom opening 36 of the pulley buckle 16, on the one hand, and the first opening 40 of the cam buckle 18, on the other hand, over and around the bars 38/39 integral to those buckles 16, 18. While strap regions 26b and 26c are adjusting, strap region 26a shortens in length but remains largely stationary.

Referring again to FIGS. 2 and 6B, as the user 44 is lengthening the leash 4, the user 44 may selectively release the locking tab 20 at any desired position along the length of strap 12 entering the cam buckle 18 to lock the cam buckle 18 in position. Consequently, the user 44 may adjust the shortened device 6 to any mid-range length 4 desired. As with the process for shortening the device, if the user 44 releases the cam buckle 18 and pull tab 22 at the position shown in FIG. 6B, the buckle 18 is automatically locked into position with the resulting device at a mid-length 4 for an intermediate distance between user 44 and dog 50.

Referring to FIG. 6A, the user 44 has released the cam buckle and pull tab 22 thereby locking the buckle 18 in position with the device in its original full length 2. The length of the device has been increased by more than half for a maximum distance between user 44 and dog 50.

As with the process for shortening the device, when lengthening the device, the user's 44 right hand 46 retains the lead 8 at all times, with the left hand 48 and slack take-up assembly 16, 18, doing the "work" of lengthening the device 6, 4, 2. By maintaining the user's 44 right hand 46 on the lead 8 at all times, the user 44 retains control over the animal 50 without risk of the animal 50 escaping.

INDUSTRIAL APPLICABILITY

It is clear that the inventive Adjustable Leash With Automatic Slack Take-Up Assembly of this application has wide applicability to the pet owner, ranch, farm and zoo industries, namely to provide a leash capable of being selectively shortened, while in use, and without change in lead hand position, to a plurality of secure, locked lengths of up to less than half the strap's original length with corresponding simultaneous automatic slack take-up. The preferred embodiment of the device is formed with a single, continuous length of leash such that if the slack take-up assembly 16, 18 were to fail, the leash would remain fully functional. The addition of a dedicated carabiner clip that cannot be removed or forgotten adds functionality to the device by allowing a user to attach any number of items to the leash, including a second dog leash.

It should be understood that various modifications within the scope of this invention can be made by one of ordinary skill in the art without departing from the spirit thereof and without undue experimentation. For example, a cord-like material may be used in lieu of fabric-based linear strap material; composite plastics may be used for the buckles, bars and/or clips; various clasp materials and designs may be utilized; various pull tab shapes, materials and designs may be utilized; the lead may be a separate length of strap; the lead may be reinforced with additional material for comfort or strength, and/or the lead may be a separate part having a non-loop design, such as an ergonomic plastic lead. This invention is therefore to be defined as broadly as the prior art will permit, and in view of the specification if need be, including a full range of current and future equivalents thereof.

We claim:

1. An adjustable leash device, comprising:
   a leash strap having a lead end, a clasp end, a first length forming a lead handle, and a second length forming a leash body;
   a slack take-up assembly comprising a pulley buckle and a cam buckle,
      said pulley buckle defining a top opening and a bottom opening, said bottom opening further defined by a pulley buckle bar;
      said cam buckle defining a first and second opening; the first opening further defined by a cam buckle bar; the second opening further defined by a spring loaded tab;
   wherein the lead end of the strap is affixed to the top opening of the pulley buckle, and the leash body is movably threaded in operative order through the first opening of the cam buckle, through the bottom opening of the pulley buckle, and through the second opening of the cam buckle.

2. The device of claim 1, wherein the cam buckle further comprises a pull tab.

3. The device of claim 1, wherein the slack take-up assembly is capable of reducing the second length of the leash body to a plurality of reduced lengths.

4. The device of claim 1, wherein the slack take-up assembly is capable of reducing the second length of the leash body to more than one-half of the second length.

5. The device of claim 1, wherein the slack take-up assembly automatically takes up slack in the leash body upon reducing the length of the leash body.

6. The device of claim 1, wherein the slack take-up assembly automatically takes up slack in the leash body upon increasing the length of the leash body.

7. The device of claim 1, wherein the leash body is shortened by fluid adjustment of the leash body in an upward direction through the second opening of the cam buckle, around the pulley buckle bar, and around the cam buckle bar.

8. The device of claim 1, wherein the leash body is lengthened by fluid adjustment of the leash body in a downward direction through the second opening of the cam buckle, around the pulley buckle bar, and around the cam buckle bar.

9. The device of claim 1 wherein the leash strap comprises a single, continuous piece of strap material of a defined length.

10. The device of claim 1 wherein the leash strap comprises a plurality of strap lengths.

11. An adjustable leash device, comprising:
   a leash strap having a lead end, a clasp end, a first length forming a lead handle, and a second length forming a leash body;
   a slack take-up assembly comprising a pulley buckle and a cam buckle, said pulley buckle defining a top opening and a bottom opening, said bottom opening further defined by a pulley buckle bar;

said cam buckle defining a first and second opening; the first opening further defined by a cam buckle bar; the second opening further defined by a spring loaded tab;

a clip affixed to said leash strap, said clip capable of attachment to an item for transport;

wherein the lead end of the strap is affixed to the top opening of the pulley buckle, and the leash body is movably threaded in operative order through the first opening of the cam buckle, through the bottom opening of the pulley buckle, and through the second opening of the cam buckle.

12. The device of claim 11, wherein the cam buckle further comprises a pull tab.

13. The device of claim 11, wherein the slack take-up assembly is capable of reducing the second length of the leash body to a plurality of reduced lengths.

14. The device of claim 11, wherein the slack take-up assembly is capable of reducing the second length of the leash body to more than one-half of the second length.

15. The device of claim 11, wherein the slack take-up assembly automatically takes up slack in the leash body upon reducing the length of the leash body.

16. The device of claim 11, wherein the slack take-up assembly automatically takes up slack in the leash body upon increasing the length of the leash body.

17. The device of claim 11, wherein the leash body is shortened by fluid adjustment of the leash body in an upward direction through the second opening of the cam buckle, around the pulley buckle bar, and around the cam buckle bar.

18. The device of claim 11, wherein the leash body is lengthened by fluid adjustment of the leash body in a downward direction through the second opening of the cam buckle, around the pulley buckle bar, and around the cam buckle bar.

19. The device of claim 11 wherein the leash strap comprises a single, continuous piece of strap material of a defined length.

20. A method of selectively adjusting a length of a leash device by a user, said leash device, comprising: a leash strap having a lead end, a clasp end, a first length forming a lead handle, and a second length forming a leash body; a slack take-up assembly comprising a pulley buckle and a cam buckle, said pulley buckle defining a top opening and a bottom opening, said bottom opening further defined by a pulley buckle bar; said cam buckle comprising a pull tab and defining a first and second opening; the first opening further defined by a cam buckle bar; the second opening further defined by a spring loaded tab; wherein the lead end of the strap is affixed to the top opening of the pulley buckle, and the leash body is movably threaded in operative order through the first opening of the cam buckle, through the bottom opening of the pulley buckle, and through the second opening of the cam buckle, said method comprising the operations of:

maintaining a grip on the lead handle with a first hand of the user;

depressing the spring loaded tab with a second hand of the user;

while depressing the spring loaded tab, pulling the pull tab with the second hand;

selectively releasing the spring loaded tab at a desired position along the second length of the leash body.

* * * * *